No. 650,214.  
J. J. ANTHONY.  
ROTARY ENGINE.  
(Application filed Sept. 14, 1899.)  
Patented May 22, 1900.

(No Model.)  
3 Sheets—Sheet 1.

WITNESSES:

INVENTOR  
J. J. Anthony  
BY  
ATTORNEYS

No. 650,214. Patented May 22, 1900.
J. J. ANTHONY.
ROTARY ENGINE.
(Application filed Sept. 14, 1899.)
(No Model.) 3 Sheets—Sheet 2.

WITNESSES
Donn Twitchell

INVENTOR
J. J. Anthony
BY
ATTORNEYS

THE NORRIS PETERS CO., PHOTO-LITHO., WASHINGTON, D. C.

No. 650,214. Patented May 22, 1900.
J. J. ANTHONY.
ROTARY ENGINE.
(Application filed Sept. 14, 1899.)
(No Model.) 3 Sheets—Sheet 3.

WITNESSES:

INVENTOR
J. J. Anthony
BY
ATTORNEYS

UNITED STATES PATENT OFFICE.

JOHN J. ANTHONY, OF MOSCOW, IDAHO.

ROTARY ENGINE.

SPECIFICATION forming part of Letters Patent No. 650,214, dated May 22, 1900.

Application filed September 14, 1899. Serial No. 730,492. (No model.)

*To all whom it may concern:*

Be it known that I, JOHN J. ANTHONY, of Moscow, in the county of Latah and State of Idaho, have invented a new and Improved Rotary Engine, of which the following is a full, clear, and exact description.

The object of the invention is to provide a new and improved rotary engine which is simple, durable, and compact in construction, very effective in operation, easily cared for and manipulated, and arranged to reduce friction to a minimum and to utilize the motive agent expansively and to the fullest advantage and with the greatest economy.

The invention consists of novel features and parts and combinations of the same, as will be fully described hereinafter and then pointed out in the claims.

A practical embodiment of my invention is represented in the accompanying drawings, forming a part of this specification, in which similar characters of reference indicate corresponding parts in all the views.

Figure 1:
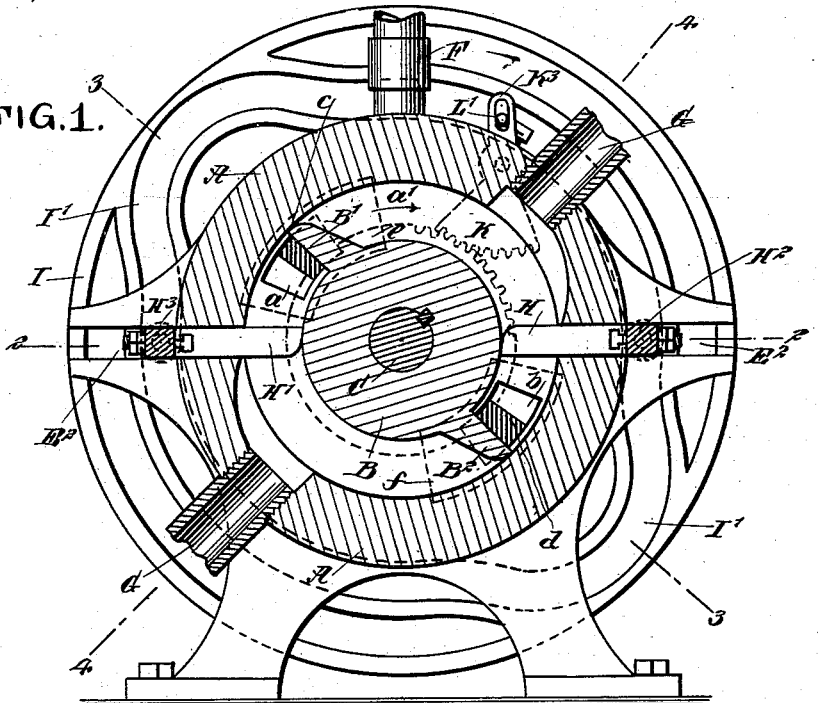
Figure 2:
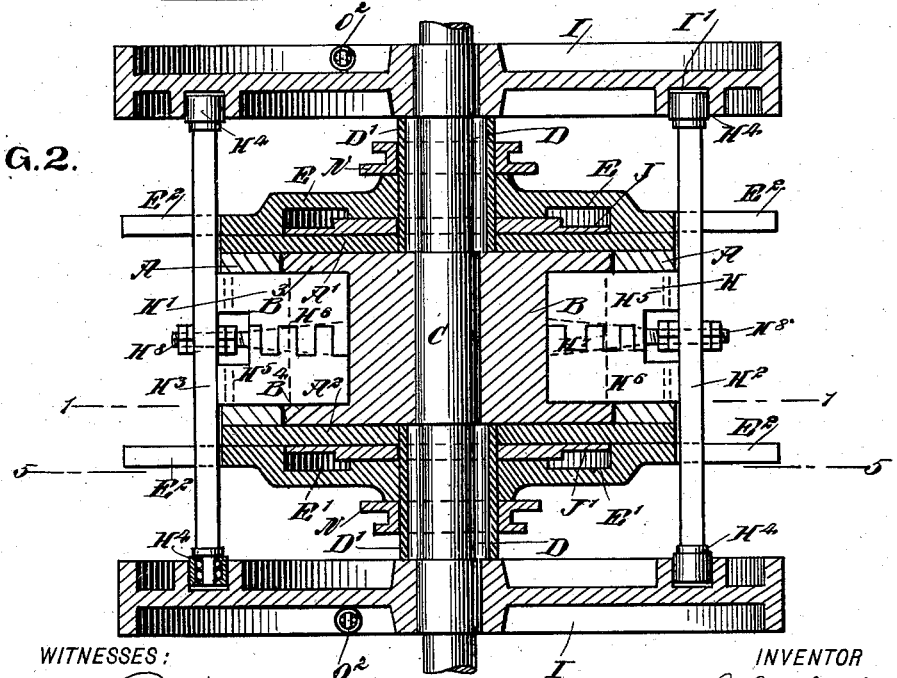
Figure 3:
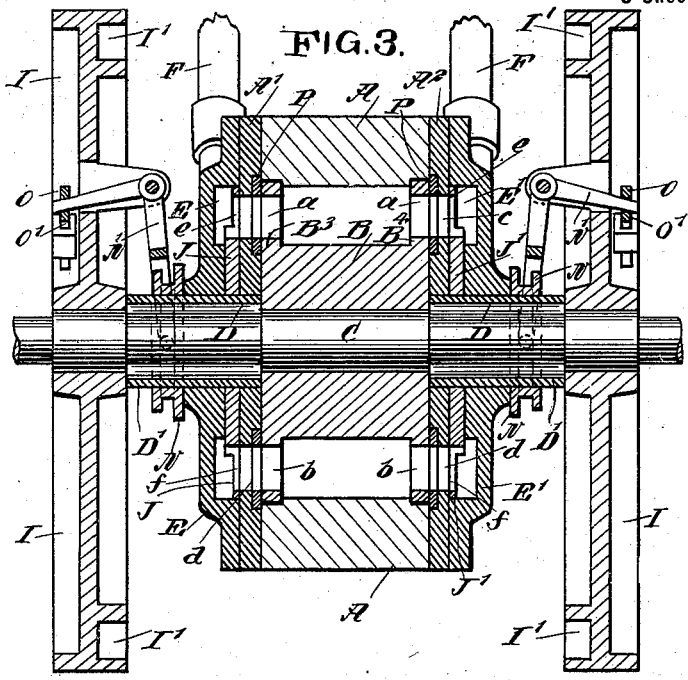
Figure 4:
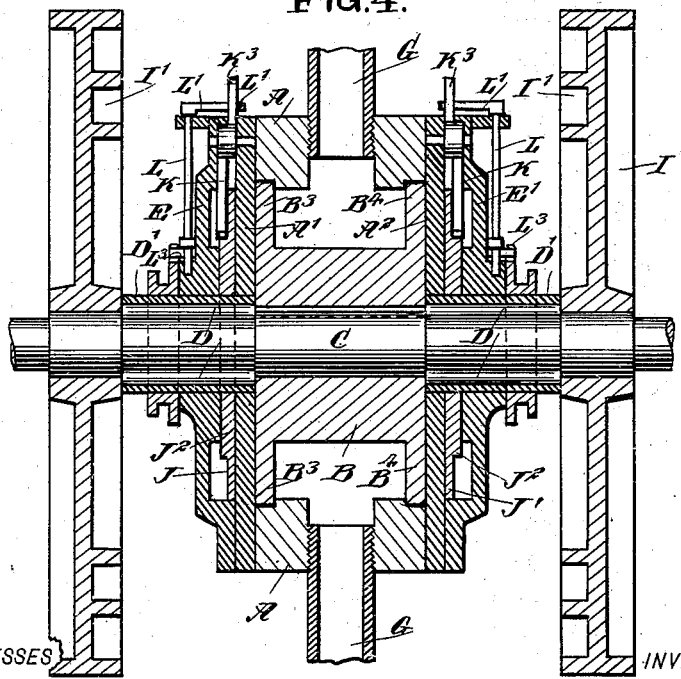
Figure 5:
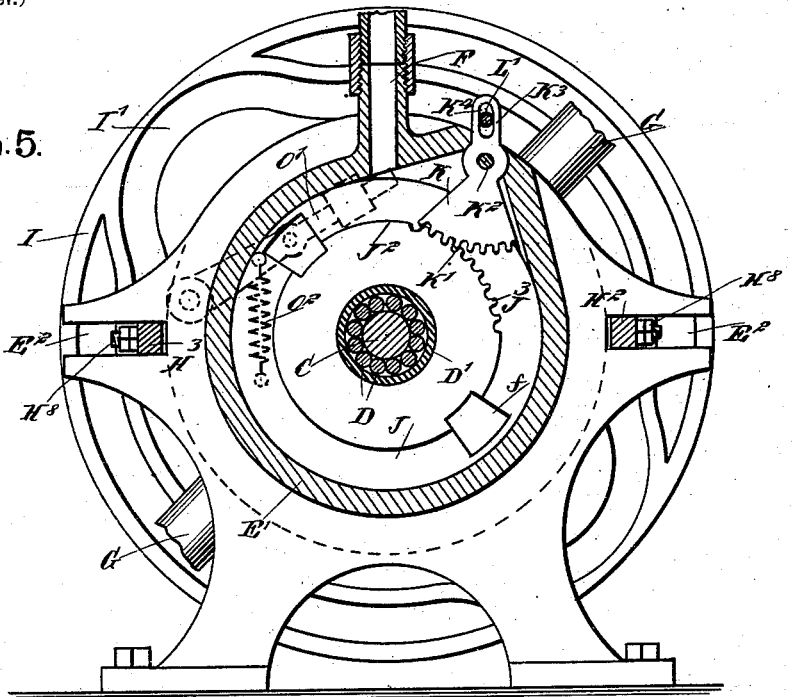
Figure 6:
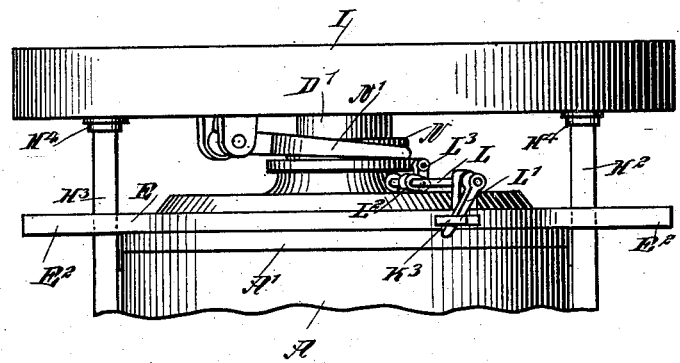
Figure 7:
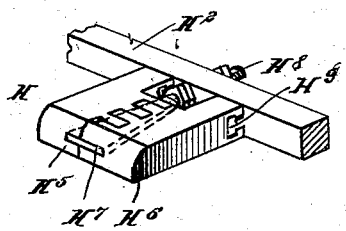

Figure 1 is a cross-section of the improvement on the line 1 1 in Fig. 2. Fig. 2 is a sectional plan view of the same on the line 2 2 in Fig. 1. Fig. 3 is a sectional side elevation of the same on the line 3 3 in Fig. 1. Fig. 4 is a similar view of the same on the line 4 4 in Fig. 1. Fig. 5 is a cross-section of the same on the line 5 5 in Fig. 2. Fig. 6 is a plan view of part of the improvement, showing more particularly the connection between the governor and the cut-off valve; and Fig. 7 is a perspective view of one of the abutments.

The improved engine is provided with a cylinder A, having heads $A'$ $A^2$ and in which is mounted to rotate a piston B, secured on a shaft C, mounted to turn in roller-bearings D, having their external casing $D'$ secured in the cylinder-heads $A'$ $A^2$ and in the chests E $E'$, secured to the cylinder-heads $A'$ $A^2$, respectively. The piston B is preferably provided with a plurality of piston-heads $B'$ $B^2$, extending to the inner peripheral surface of the cylinder, so as to form a plurality of working chambers in the cylinder to simultaneously receive the motive agent from the two chests E $E'$, each of which is provided with a supply-pipe F, connected with a suitable source of motive-agent supply. The exhaust motive agent passes from the working chambers through properly-arranged pipes G to a suitable place of discharge.

In the cylinder A are mounted to slide radially the abutments H $H'$, adapted to abut with their inner ends on the peripheral surface of the piston B between annular flanges $B^3$ $B^4$, and said abutments are secured to bars $H^2$ $H^3$, respectively, mounted to slide in guideways $E^2$, formed on or secured to the chests E $E'$, as plainly indicated in the drawings. On the ends of the bars $H^2$ $H^3$ are journaled friction-rollers $H^4$ in engagement with cam-grooves $I'$, formed on cam-wheels I, secured on the piston-shaft C, so that the cam-wheels control the abutments. The cam-wheels may also serve as fly-wheels for the engine and as power-transmitting wheels for transmitting the rotary motion of the engine to other machinery. The cam-grooves $I'$ in the cam-wheels I are so arranged that the abutments H $H'$ are simultaneously moved outward or inward to allow the piston-heads to pass, the inward motion being accomplished immediately after the heads have passed the abutments. The piston-flanges $B^3$ $B^4$ are in contact with the inner faces of the cylinder-heads $A'$ $A^2$, and in each of said flanges are formed inlet-ports $a$ $b$, preferably arranged diametrically opposite each other immediately in front of the piston-heads $B'$ $B^2$. The ports $a$ $b$ register with ports $c$ $d$, respectively, formed in each of the cylinder-heads $A'$ $A^2$, and said ports are adapted to register with ports $e$ $f$, respectively, formed in the cut-off valves J $J'$, mounted to rotate on the ball-bearing casings $D'$ $D'$ within the chests E $E'$, respectively.

Each of the cut-off valves J $J'$ is provided with an offset $J^2$, formed on its peripheral surface with gear-teeth $J^3$ (see Fig. 5) in mesh with teeth $K'$ of a segmental gear-wheel K, journaled at $K^2$ in the corresponding chest E or $E'$. The outer end $K^3$ of each segmental gear-wheel K is formed with an elongated slot $K^4$, into which projects the end of an arm $L'$ on a crank-shaft L, mounted to turn in suitable bearings arranged on the corresponding chest E or $E'$. Each shaft L is provided with an arm $L^2$, connected by a link $L^3$ (see Fig. 6) with a shifting collar N, mounted to slide on the ball-bearing casing $D'$, and each shifting collar is engaged by a bell-crank lever $N'$, controlled by a centrifugal governor O on the corresponding cam-wheel I. This centrifugal governor O consists, essentially, of a weighted lever O', fulcrumed on the cam-wheel I and held against outward movement by a spring O², as indicated in dotted lines in Fig. 5.

When the engine runs at a normal rate of speed, then the ports $e f$ in the cut-off valves J J' register with the cylinder-head ports $c d$; but when the engine runs at a higher rate of speed then the action of each centrifugal governor causes a swinging of the bell-crank lever N', so that the shifting collar N is moved in a longitudinal direction relatively to the shaft C, and consequently a turning motion is given to the shaft L, so that the arm L' thereof imparts a swinging motion to the corresponding segmental gear-wheel K to turn the cut-off valve J or J' and move the ports $e f$ more or less out of register with the ports $c d$ to produce the desired cut-off and thereby admit less motive agent to the engine until the latter again runs at a normal rate of speed. When the several parts are in the position illustrated in Fig. 1, then the ports $c e$ and $d f$ are in full register and the ports $a b$ have just moved into register with the ports $c d$, so that the motive agent from the chests E E' can pass into the cylinder A to press against the piston-heads B' B² and rotate the piston B in the direction of the arrow $a'$, the abutments H H' now being in an innermost position. As the piston B rotates its ports $a b$ finally cut off from the ports $c d$, so that no more motive agent is admitted to the cylinder, and the motive agent now in the working chambers works expansively until the piston-heads B' B² uncover the exhaust-pipes G to allow the exhaust motive agent to escape from the working chambers. The cylinder A is cut out at the inner ends of the exhaust-pipes G in the direction toward the abutments H H', so that exhaust takes place from the cylinder until the piston-heads pass the abutments and the latter have again been moved into an innermost position, it being understood that said abutments are moved outward by the action of the cam-wheels I immediately previous to the piston-heads coming close to said abutments. When the piston-heads have passed the abutments and the latter have moved into an innermost position, then the ports $a b$ begin to register with the ports $d c$, respectively, and motive agent is again admitted into the two working chambers to give another impulse to the piston B in the direction of the arrow $a'$. As the piston rotates the ports $a b$ soon cut off on the ports $d c$ to prevent further admission of motive agent to the cylinder and to allow the motive agent contained in the cylinder to work expansively on the piston-heads in the manner previously mentioned. When the piston-heads finally pass the exhaust-pipes G, then exhaust takes place, as previously described.

In order to prevent leakage at the registering ports, I provide the heads A' A² at the ports $c d$ with suitable packing-plates P, let in the cylinder-heads A' A², as indicated in Fig. 3. In order to prevent leakage at the abutments, I prefer to construct each of the same in two sections H⁵ H⁶, (see Fig. 7,) having their adjacent ends interlocked, a wedge H⁷ being in the adjacent ends to move the sections H⁵ H⁶ apart in firm contact with the inner faces of the piston-flanges B³ B⁴. The wedge H⁷ terminates in a bolt H⁸, engaging the corresponding bar H² or H³ and serving to adjust the wedge for adjusting the sections H⁵ H⁶. The sections are held on tongues H⁹ on the insides of the bars H² H³, as shown in Fig. 7.

Having thus described my invention, I claim as new and desire to secure by Letters Patent—

1. A rotary engine, provided with a cylinder, a plurality of sliding abutments in the cylinder, chests on the cylinder-heads, a piston with a plurality of piston-heads and mounted to rotate in the cylinder and arranged to admit motive agent to the cylinder from both chests at the same time and into separate compartments formed in the cylinder by the piston-heads and the said abutments, valves in the steam-chests for controlling the admission of steam from chests to the compartments of the cylinder, and separate exhaust-pipes leading from the cylinder at the periphery thereof, substantially as shown and described.

2. A rotary engine, provided with a cylinder, a chest having a port connection with the cylinder, a piston mounted to turn in said cylinder and having a piston-head, and circular end flanges formed with ports for registering with said port connection, to control the admission of the live motive agent to the cylinder from the chest, an abutment slidable in the cylinder and adapted to engage the piston between the flanges thereof, and a cam on the shaft of the piston for controlling said abutment, substantially as shown and described.

3. A rotary engine provided with a cylinder, a chest having a port connection with the cylinder, a piston mounted to turn in said cylinder and having a piston-head, and circular end flanges formed with ports for registering with said port connection, to control the admission of the live motive agent to the cylinder from the chest, an abutment slidable in the cylinder and adapted to engage the piston between the flanges thereof, a cam on the shaft of the piston for controlling said abutment, and a governor-controlled cut-off valve in said chest and operating over the said port connection, as set forth.

4. A rotary engine, comprising a cylinder provided with a plurality of admission-ports in the cylinder-heads and exhaust-ports in the peripheral wall, a piston mounted to turn in said cylinder and having a plurality of piston-heads, circular flanges having ports for registering with said admission-ports in the cylinder-heads, chests at the cylinder-heads and connected with a motive-agent supply, circular cut-off valves in said chests and having ports adapted to register with said ports in the cylinder-heads, and centrifugal governors for controlling said cut-off valves, substantially as shown and described.

5. A rotary engine, comprising a cylinder provided with a plurality of admission-ports in the cylinder-heads and exhaust-ports in the peripheral wall, a piston mounted to turn in said cylinder and having a plurality of piston-heads, circular flanges having ports for registering with said admission-ports in the cylinder-heads, chests at the cylinder-heads and connected with a motive-agent supply, circular cut-off valves in said chests and having ports adapted to register with said ports in the cylinder-heads, centrifugal governors for controlling said cut-off valves, abutments slidable in said cylinder, cam-wheels on the piston-shaft, and connections between the cam-wheels and the abutments, as set forth.

6. A rotary engine, comprising a cylinder provided with a plurality of admission-ports in the cylinder-heads and exhaust-ports in the peripheral wall, a piston mounted to turn in said cylinder and having a plurality of piston-heads, circular flanges having ports for registering with said admission-ports in the cylinder-heads, chests at the cylinder-heads and connected with a motive-agent supply, circular cut-off valves in said chests and having ports adapted to register with said ports in the cylinder-heads, abutments slidable in the cylinder, cam-wheels on the piston-shaft, and connections between the cam-wheels and the abutments, substantially as shown and described.

7. A rotary engine, comprising a cylinder provided with a plurality of admission-ports in the cylinder-heads and exhaust-ports in the peripheral wall, a piston mounted to turn in said cylinder and having a plurality of piston-heads, circular flanges having ports for registering with said admission-ports in the cylinder-heads, chests at the cylinder-heads and connected with a motive-agent supply, circular cut-off valves in said chests and having ports adapted to register with said ports in the cylinder-heads, abutments slidable in the cylinder, cam-wheels on the piston-shaft, connections between the cam-wheels and the abutments, centrifugal governors on said cam-wheels, and connections between the governors and said cut-off valves, to actuate the same, substantially as shown and described.

8. A rotary engine, comprising a cylinder provided with a plurality of admission-ports in the cylinder-heads and exhaust-ports in the peripheral wall, a piston mounted to turn in said cylinder and having a plurality of piston-heads, circular flanges having ports for registering with said admission-ports in the cylinder-heads, chests at the cylinder-heads and connected with a motive-agent supply, circular cut-off valves in said chests and having ports adapted to register with said ports in the cylinder-heads, abutments slidable in the cylinder, cam-wheels on the piston-shaft, connections between the cam-wheels and the abutments, centrifugal governors on said cam-wheels, connections between the governors and said cut-off valves, to actuate the same, said connection comprising bell-crank levers on the cam-wheels, slidable shifting collars engaged by the bell-crank levers, crank-arm shafts connected by arms with said shifting collars, and segmental gear-wheels in mesh with teeth on said cut-off valves and connected with said crank-shaft, substantially as shown and described.

9. In a rotary engine, the combination with a cylinder provided with steam chests and ports in its heads, of a piston mounted to revolve in the cylinder and provided with piston-heads, and end flanges having ports therein, sliding abutments in the cylinder, circular valves mounted in the steam-chests and provided with ports, and with teeth on their peripheries, segmental gear-wheels engaging the teeth of the valve, a governor, and means for operating the segmental gear-wheels from the governor, substantially as described.

10. In a rotary engine, the combination with a cylinder provided with steam chests and ports in its heads, of a piston mounted to revolve in the cylinder and provided with piston-heads and end flanges formed with ports, sliding abutments in the cylinder, circular valves mounted in the steam-chest and provided with ports and with teeth on their peripheries, segmental gear-wheels engaging the teeth of the valves, and provided with slots, crank-shafts engaging the slots of the segmental gear-wheels, shifting collars with which the said crank-shafts are connected, a governor, and means for operating the said collars from the governor, substantially as described.

11. In a rotary engine, an abutment, formed of two interlocking sections, each having a sliding connection with a support, and means between the sections for moving the sections apart, substantially as described.

12. In a rotary engine, an abutment, comprising two sections having their adjacent edges interlocked, a wedge in the adjacent edges, and means for adjusting the wedge, substantially as described.

JOHN J. ANTHONY.

Witnesses:
WARREN D. GANO,
MYRON E. ROGERS.